May 29, 1934.	B. M. CARLSON	1,960,330
MUSIC TEACHING DEVICE
Filed Jan. 4, 1932
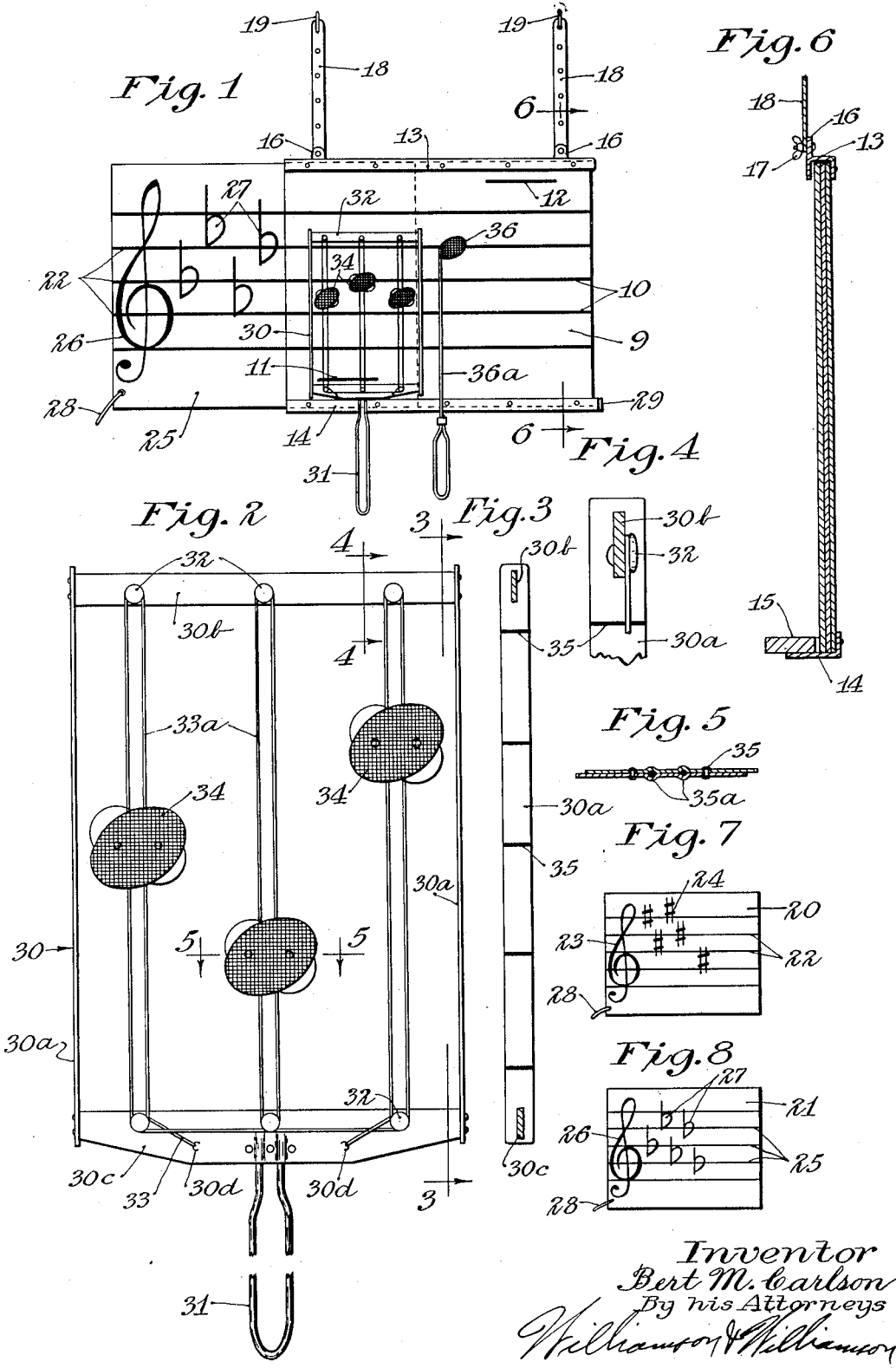

Patented May 29, 1934

1,960,330

UNITED STATES PATENT OFFICE 1,960,330

MUSIC TEACHING DEVICE

Bert M. Carlson, Platteville, Wis.

Application January 4, 1932, Serial No. 584,646

7 Claims. (Cl. 84—472)

This invention relates to music teaching devices particularly adapted for use in schools to teach children how to read music.

It is the main object of the invention to provide a note holder carrying a plurality of adjustable note heads, which note holder can be placed against a music staff by a teacher to permit pupils to readily read music off the staff.

A further object is to provide in combination with the note holder, a single note head that can be placed against the music staff and can be quickly carried from one position to another on the staff.

The objects and advantages of the present invention will more fully appear from the following description, made in connection with the accompanying drawing, wherein like reference characters refer to the same or similar parts throughout the various views and, in which, Fig. 1 is a view in front elevation of a music chart, a note holder and a single note head embodying the invention, the different parts being arranged as they may be placed when in actual use;

Fig. 2 is a view in front elevation of the note holder showing the same on an enlarged scale;

Fig. 3 is a vertical section taken substantially on the line 3—3 of Fig. 2, as indicated by the arrows;

Fig. 4 is a vertical section taken on the line 4—4 of Fig. 2, as indicated by the arrows;

Fig. 5 is a horizontal section taken on the line 5—5 of Fig. 2, as indicated by the arrows;

Fig. 6 is a vertical section taken through the chart on the line 6—6 of Fig. 1, as indicated by the arrows; and Figs. 7 and 8 are views in front elevation of certain plates of the chart.

The chart illustrated includes a main plate 9 having five horizontal spaced parallel lines 10 painted or printed thereon to form a music staff. A short line 11 is also printed or painted on the plate 9 below the regular staff lines 10 to form a first added line below the staff, while a similar line 12 is printed or painted on the plate 9 above the staff lines 10 to form a first added line above the staff. Secured to the upper edge of the plate 9 is a channel bar 13, while secured to the lower edge of the plate 9 is an angle bar 14. A bar 15 is secured to the angle bar 14 in rearwardly spaced relation from the forward and upturned flange of the angle bar and it will be seen that the angle bar 14 and the bar 15 form a horizontal guide oppositely disposed from a horizontal guide formed by the channel bar 13. Lugs 16 are secured to or formed integral with the channel bar 13 adjacent the ends thereof, and attached to these lugs as by wing nut equipped bolts 17, are short arms 18 having a series of spaced holes cut therein. The arms 18 may be supported by hooks 19 or the like, applied as over the blackboard of a school room, and it will be seen that the height of the chart may be suitably adjusted by reason of the plurality of holes in the arms 18. The bar 15 is used to space the lower portion of the chart as from a blackboard or the like. Slidably mounted within the guides formed by the bars 13, 14 and 15, are two plates numbered 20 and 21 respectively. Plate 20 has staff lines 22 thereon and a clef 23 also printed or painted over the staff lines adjacent the left end of the plate. A plurality of sharps 24 are also printed or painted at their proper positions on the plate 20 to designate the signatures. The plate 21 also has staff lines 25 and a clef 26 printed or painted thereon, but this plate unlike the plate 20 has a plurality of flats 27 printed or painted at their proper positions thereon to designate other signatures than those designated by the sharps 24 on the plate 20. Draw strings 28 are attached to the lower left hand corners of the two plates 20 and 21 to permit ready withdrawal of the respective plates from the left end of the plate 9. A short bar 29 connects the upturned flange of the angle bar 14 and the bar 15 at the right ends of the same to prevent withdrawal of the plates 20 and 21 beyond the right end of plate 9.

The note holder forming the main part of my invention includes a frame 30 of substantially rectangular shape and formed by side bars 30a and top and bottom bars 30b and 30c respectively. A downwardly projecting handle 31 is applied to the bottom bar 30c to permit the frame being readily held in the hand of a music teacher. Three or more headed studs 32 are secured to the top and bottom bars 30b and 30c respectively and these studs are spaced from each other longitudinally of the bars and the studs on the top bar 30b are disposed in opposing relation to the studs on the bottom bar 30c. A wire such as a steel piano wire 33 is strung over the various studs 32 so as to form between opposing studs on the two bars 30b and 30c, pairs of closely spaced wire guides 33a. Preferably the ends of this wire 33 will be attached to the lower bar 30c by inserting the ends of the wire within small openings formed by pressing tabs 30d from the bar 30c and then by bending these tabs 30d back in place to catch the ends of the wire. Although the number of the wire guides 33a provided may be varied if desired, preferably at least three sets of these guides will be provided. Note heads 34 are slidably mounted on each set of wire guides 33a. These note heads 34 preferably consist of two oval-shaped plates of sheet material connected together by means of rivets 35, so that one of the plates has its greatest length diagonally disposed relative to one side of the frame 30, while the other plate has its greatest length diagonally disposed opposite to the disposition of the greatest length of its mating plate. In other words, the two plates forming a single note head 34 cross each other. Before these plates are secured together by the rivets 35, they are concavely curved and their concave sides are placed to face each other, whereupon the plates are compressed against their spring tension and the rivets 35 are driven in place. Accordingly, the two plates forming each note head 34 are held together under spring tension. The plates forming the note heads have vertical channels 35a therein within which the wire guides 33a fit. Due to the construction specified, the note heads 34 may be slid from one position to another on their respective wire guides 33a, but after being slid to a given position, the note heads will be held in frictional contact with the wire guides 33a due to the resilient tension of the plates forming the note heads. The exterior surfaces of the plates forming the note heads 34 are preferably painted or colored in sharp contrast to the interior surfaces of these plates and preferably the exterior surfaces will be painted black as indicated in the drawing, while the interior surfaces will be painted white to correspond with the white color of the portions of the plate 9 between the staff lines 10. The bars 30a and 30b of the note holder will also be preferably colored white, while several spaced parallel lines 35 corresponding in spacing to the spacing of the staff lines 10 will be painted or printed on the inner surfaces of the side bars 30a, as best shown in Fig. 3.

For use in combination with the note holder, there is provided a single note head 36 consisting of an oval-shaped disk preferably painted black and connected to a shank 36a terminating at its lower end in a handle.

The device is used chiefly in school rooms for testing the voices of pupils and for teaching the pupils to rapidly read music. Preferably the chart will be hung at the front of the schoolroom at such a level that it may be readily observed by all the pupils. The music teacher preparatory to using the device, will grasp one of the cords 28 and will pull out one of the plates 20 or 21 from the left end of the plate 9 to expose a desired key signature for use. By extending the plates 20 and 21 more or less from the left end of the plate 9, it will be seen that any desired signature key may be exposed to view. The note holder will be held in one hand of the teacher and preparatory to use, the note heads 34 will be adjusted to desired positions on the wire guides 33a by sliding the note heads on the wire guides and alining them relative to the lines 35 on the side bars 30a of the note holder. The note holder may then be held by one hand of the teacher against the plate 9, so that the various note heads 34 fall at certain note spaces against the staff 10. The teacher with his free hand will grasp the single note head 36 and position this note head as desired relative to the staff lines 10 and the lines 11 and 12. Pupils may be called on to sing the various notes thus exhibited and by shifting the position of the single note head 36 relative to the staff lines 10, various combinations of notes may be quickly brought to view. Of course, the note holder may be shifted to different positions on the staff 10 to vary the note combinations and still other combinations can be obtained without adjusting the note heads 34 by first exposing one side of the note holder to view and then exposing the other side of the note holder to view. Of course, from time to time the note heads 34 may be slid to different positions so that any combination of notes may be obtained. It is thus possible for the teacher to "write" music for the pupils to sing. Although there are many different ways of using the music teaching device, it is thought unnecessary to go into a more detailed explanation here.

The music teaching device is quite simple in construction and it has been proven to be successful for use in actual practice. It will, of course, be understood that the note holder and a single note head can be used in connection with any type of blank music staff, although the chart illustrated is particularly effective for use with the note holder and single note head.

It will, of course, be understood that various changes may be made in the form, details, arrangement and proportions of the various parts without departing from the scope of the present invention, which generally stated, consists in the matter shown and described, and set forth in the appended claims.

What is claimed is:—

1. A note holder comprising a rectangular frame, pairs of spaced parallel wires extending across said frame from top to bottom thereof and note heads slidably mounted for movement on each pair of parallel wires, said note heads comprising pairs of oppositely facing disks, the disks of each pair being riveted together, and said disks having channels within which the wires are received.

2. The structure defined in claim 1, said disks being under spring tension to frictionally engage the wires and thereby hold the note heads in desired positions.

3. A note holder for use with a music staff, comprising a rectangular frame having top and bottom bars, projecting studs mounted on said top and bottom bars in spaced and opposed relation and wires strung over said studs and running vertically between said top and bottom bars to form a plurality of pairs of closely spaced parallel lengths of wire and note heads slidably mounted on each pair of parallel lengths of wire and frictionally engaging the same to cause retention of the note heads at desired adjusted positions.

4. A note holder for use with a music staff, comprising a frame, a plurality of sets of closely spaced parallel wires strung across said frame from top to bottom thereof and note heads slidably mounted on each set of wires, each note head comprising a pair of oppositely inclined oval-shaped disks secured together and having channels therein within which said wires fit, the exterior surfaces of said disks being painted a color contrasting with the inner surfaces thereof whereby said note heads may be adjusted on said wires and placed against the music staff with one side of said frame facing outwardly to bring said note heads in a certain relation with said music staff and said frame may then be reversed to cause the other side thereof to face outwardly to bring said note heads into a different relation with said music staff.

5. A note holder for use with a horizontally disposed music staff, comprising a bodily movable frame adapted to be held in the hand and having no connection with said music staff, supporting members strung across said frame from top to bottom thereof and note heads slidably mounted on said supporting members and frictionally engaging said members to retain their respective positions.

6. A note holder for use with a horizontally disposed music staff, comprising a bodily movable frame adapted to be held in the hand and having no connection with said music staff, supporting members strung across said frame in spaced parallel relation from top to bottom thereof, note heads slidably mounted on said supporting members and frictionally engaging said supporting members to retain their respective positions after being set, and spaced parallel lines marked on one side of said frame and corresponding in spacing with the staff lines of the staff with which the note holder is adapted to be used, said lines being used to correctly vertically position the note heads on said supporting members.

7. A music teaching device for use with a music staff comprising a bodily movable frame adapted to be held in the hand and having no connection with said musical staff, supporting members strung across said frame from top to bottom thereof, note heads slidably mounted on said supporting members and frictionally engaging the same to cause retention of said note heads at desired adjusted positions, a shank and a note head mounted on said shank whereby said frame may be placed against a music staff and said first mentioned note heads may be positioned as desired relative to said staff and said last mentioned note head may be quickly carried from one position to another position relative to said staff.

BERT M. CARLSON.